United States Patent [19]

Wiebelhaus

[11] 3,843,795

[45] Oct. 22, 1974

[54] METHODS FOR PRODUCING GLUCOCORTICOID-LIKE WATER DIURETIC AND ANTI-INFLAMMATORY ACTIVITY WITH DECININE

[75] Inventor: Virgil D. Wiebelhaus, Springfield, Pa.

[73] Assignee: Smithkline Corporation, Philadelphia, Pa.

[22] Filed: Apr. 16, 1973

[21] Appl. No.: 351,703

Related U.S. Application Data

[63] Continuation-in-part of Ser. No. 197,951, Nov. 11, 1971, abandoned.

[52] U.S. Cl. ............................................. 424/267
[51] Int. Cl. ............................................. A61k 27/00
[58] Field of Search ...................... 424/267; 200/236

[56] References Cited
UNITED STATES PATENTS
3,184,446   5/1965   Weisbach .......................... 260/236

OTHER PUBLICATIONS

Chem. Abst. 65, (1966), pp. 17014–17015.

Kaplan et al., J. Pharm. Sciences, Vol. 56, No. 11, Nov. 1967, pp. 1385–1392.

*Primary Examiner*—Stanley J. Friedman
*Attorney, Agent, or Firm*—Joan S. Keps; Richard D. Foggio; William H. Edgerton

[57] ABSTRACT

Decinine, a Lythraceae alkaloid, or a pharmaceutically acceptable, acid addition salt thereof is used in the pharmaceutical compositions and methods of this invention for producing glucocorticoid-like water diuretic and anti-inflammatory activity and in methods for reducing tissue barrier permeabilities.

5 Claims, No Drawings

METHODS FOR PRODUCING GLUCOCORTICOID-LIKE WATER DIURETIC AND ANTI-INFLAMMATORY ACTIVITY WITH DECININE

This application is a continuation-in-part of Ser. No. 197,951 filed Nov. 11, 1971, now abandoned.

This invention relates to new pharmaceutical compositions and methods using decinine or a pharmaceutically acceptable acid addition salt thereof. In particular, this invention relates to pharmaceutical compositions and methods of producing glucocorticoid-like water diuretic and anti-inflammatory activity and in addition, to a method of reducing tissue barrier permeabilities in an animal organism.

Decinine, which used as the base or a pharmaceutically acceptable acid addition salt thereof is the active ingredient in the pharmaceutical compositions and methods of this invention, is a Lythraceae alkaloid which has been isolated from *Decodon verticillatus* (Ferris, *J. Org. Chem.* 27:2985, 1962) and *Lagerstroemia indicia* (Ferris et al., *J. Am. Chem. Soc.* 93:2958, 1971). Decinine is represented by the following structural formula:

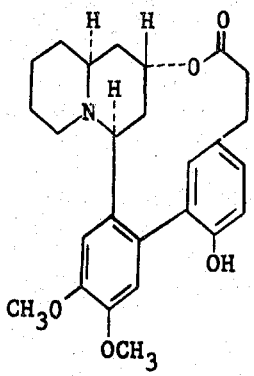

Related Lythraceae alkaloids have been reported to have biological activity, i.e. lythrine is reported to have diuretic activity, U.S. Pat. No. 3,184,446, and vertine (cryogenine) is reported to have anti-inflammatory activity, Kaplan et al., *J. Pharm. Sciences* 56:1385–1392 (1967).

Decinine differs from lythrine and vertine in chemical structure in that decinine has a saturated alkyl chain between a phenyl ring and a lactone carbonyl while lythrine and vertine have an unsaturated chain, i.e. a cinnamic lactone grouping. In addition, decinine differs from vertine in stereochemical configuration in the quinolizidine ring. Ferris et al., *J. Am. Chem. Soc.* 93:2942–2952 (1971).

It has now been found that, although decinine is not steroidal in chemical structure, it possesses the useful properties of the glucocorticoids; in particular, decinine reduces tissue barrier permeabilities in an animal organism and has glucocorticoid-like water diuretic and anti-inflammatory activity.

Water diuretic activity shows that a substantial effect on tissue barrier permeabilities acting to restore resistance to free diffusion is produced. Drugs having this activity may be expected to restore normal permeabilities to a variety of tissues and therefore possess many diverse pharmacological utilities. The action on cell permeabilities is an effect on one of the basic requirements of all cells in the maintenance of their structure and function.

Decinine is more effective and differs from glucocorticoids, for example prednisone, in completely antagonizing the antidiuretic properties of antidiuretic hormone (ADH) while glucocorticoids only partially antagonize ADH. As a completely effective antagonist of ADH, decinine may possess hypotensive and coronary vasodilator activity.

A water diuretic should be a desirable adjunctive therapy in treatment of obesity to mobilize fluids as fats are catabolized.

Since many reports indicate a retention of water during the depressive phase of manic-depressive psychoses, a water diuretic may have a desirable antidepressant activity. Glucocorticoids have been reported to involve some degree of euphoria but have many side-effects.

The pharmaceutical compositions and methods of this invention can be used therapeutically in edematous conditions, particularly where hyponatremia exists, for example in congestive heart failure and cirrhosis of the liver and also can be used therapeutically, as glucocorticoids are, in treatment of nephrosis.

The water diurectic activity of decinine is demonstrated in adrenalectomized (ADX) water-loaded rats at doses of about 5 mg./kg. to about 60 mg./kg. orally. The ability to remedy defective water excretion by ADX rats, determined by this test, is a means of determining glucocorticoid-like activity. Wiebelhaus et al., *Third International Congress of Nephrology*, Vol. II, page 296, Washington, D.C., 1966.

Water diuretic activity of decinine is also demonstrated by its ability to antagonize the effects of antidiuretic hormone (ADH), i.e., vasopressin, in water-loaded rats. This anti-ADH activity is shown by administering antidiuretic hormone to control animals and to animals treated with decinine, and measuring urine volumes. Decinine produces anti-ADH activity at doses of about 1 mg./kg. to about 30 mg./kg. orally, with maximal activity at doses of about 10 mg./kg. to about 30 mg./kg. orally.

The anti-inflammatory activity of decinine is shown by its ability to inhibit carrageenin-induced abcess in rats at doses of about 5 mg./kg. to about 100 mg./kg. orally and to inhibit rat paw edema at doses of about 5 mg./kg. to about 45 mg./kg. orally.

Also, decinine inhibits adjuvant-induced polyarthritis in rats as shown by decrease in the inflamed hind leg volumes in experimental rats, when compared to controls, produced by oral administration of decinine.

The procedures for determining water diuretic activity in adrenalectomized water-loaded rats and anti-inflammatory activity by carageenin-induced abcess and rat paw edema tests are described by Maass et al., *J. Pharm. Exp. Therap.* 163:239–249 (1968).

Decinine is more active than lythrine and vertine in producing water diuretic and anti-inflammatory activity.

The pharmaceutical compositions of this invention are prepared in conventional dosage forms by incorporating decinine or a pharmaceutically acceptable acid addition salt thereof with pharmaceutical carriers according to accepted pharmaceutical practices. The resulting pharmaceutical compositions are objects of this invention. The active ingredient, that is decinine as the base or pharmaceutically acceptable acid addition salt thereof, will be present in the compositions of this invention in an amount sufficient to produce glucocorticoid-like water diuretic and anti-inflammatory activity.

Preferably, the compositions of this invention contain the active ingredient in an amount of from about 5 mg. to about 300 mg., advantageously from about 25 mg. to about 200 mg., per dosage unit.

The pharmaceutical carrier may be, for example, either a solid or liquid. Exemplary of solid carriers are lactose, magnesium stearate, terra alba, sucrose, talc, stearic acid, gelatin, agar, pectin, acacia and the like. Exemplary of liquid carriers are alcohols (such as ethanol or propylene glycol), water containing a solubilizing agent (for example polyethylene glycol), peanut oil, olive oil and the like. The carrier or diluent may include a time delay material such as glyceryl monostearate or glyceryl distearate alone or with a wax.

A wide variety of pharmaceutical forms can be employed. Thus, if a solid carrier is used, the preparation can be tableted, placed in a hard gelatin capsule in powder or pellet form or in the form of a troche or lozenge. The amount of solid carrier will vary widely but preferably will be from about 25 mg. to about 1 mg. If a liquid carrier is used, the preparation may be in the form of a syrup, emulsion, soft gelatin capsule, liquid suspension or solution, or a sterile injectable liquid for parenteral use, for example in an ampule.

The pharmaceutical compositions of this invention in liquid suspension or solution form do not include simple liquid suspensions or solutions of the active ingredient in common solvents not adapted for internal administration to produce the desired pharmacological activity.

A dosage unit in the form of a tablet, capsule, troche, lozenge, liquid suspension or solution or sterile injectable liquid for internal administration to produce glucocorticoid-like water diuretic and anti-inflammatory activity comprising a pharmaceutical carrier and, in an amount sufficient to produce said activity, decinine or a pharmaceutically acceptable acid addition salt thereof is also an object of this invention.

The methods of reducing tissue barrier permeabilities in an animal organism and of producing glucocorticoid-like water diuretic and anti-inflammatory activity in accordance with this invention comprise administering decinine or a pharmaceutically acceptable acid addition salt thereof internally to an animal organism in an amount sufficient to produce said activity. The active ingredient will preferably be administered in dosage unit forms as described above. The route of administration will be orally or parenterally, preferably orally. Preferably, the active ingredient will be administered in a daily dosage regimen of from about 5 mg. to about 1,000 mg., most preferably from about 25 mg. to about 600 mg. Advantageously, equal doses will be administered one to four times daily. When the administration is carrier out as described above, glucocorticoid-like water diuretic and anti-inflammatory activity is produced.

The pharmaeutical compositions are made by conventional techniques of the art, such as mixing, granulating and compressing when necessary or variously mixing and dissolving the ingredients as appropriate to the desired composition.

The pharmaceutically acceptable, acid addition salts of decinine are formed with organic and inorganic acids by methods known to the art. The base is reacted with an organic or inorganic acid in aqueous miscible solvent, such as acetone or ethanol, with isolation of the salt by concentration and cooling or in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric, and nitric acids. Of course, these salts may also be prepared by the classical method of double decomposition of appropriate salts which is well-known to the art. These salts are used as is decinine in the compositions and methods of this invention.

The following examples are not limiting but are illustrative of this invention.

EXAMPLE 1

| Ingredients | Amounts |
| --- | --- |
| Decinine | 50 mg. |
| Lactose | 75 mg. |

The ingredients are mixed, screened and filled into a hard gelatin capsule.

A capsule, prepared as described above, is administered three times per day.

EXAMPLE 2

| Ingredients | Amounts |
| --- | --- |
| Decinine | 100 mg. |
| Sucrose | 25 mg. |
| Starch | 20 mg. |
| Talc | 5 mg. |
| Stearic acid | 3 mg. |

The decinine and sucrose are mixed and granulated with 10 percent gelatin solution. The wet granules are screened, dried and then mixed with the starch, talc and stearic acid, screened and compressed into a tablet.

EXAMPLE 3

| Ingredients | Amounts |
| --- | --- |
| Decinine | 75 mg. |
| Peanut oil | 125 mg. |

The ingredients are mixed and filled into a soft gelatin capsule.

EXAMPLE 4

| Ingredients | Amounts |
| --- | --- |
| Decinine hydrochloride | 100 mg. |
| Lactose | 75 mg. |

The ingredients are mixed, screened and filled into a hard gelatin capsule.

EXAMPLE 5

Decinine (1.3126 g.) is dissolved in 17.5 ml. of hot isopropanol. Sulfuric acid (0.1472 g.) in 3 ml. of water is added. The mixture is cooled overnight and filtered. The precipitate is washed with isopropanol, dried in vacuo at 80°C. and then treated with boiling water. The mixture is cooled to room temperature and filtered to give decinine bisulfate.

The filtrate is evaporated to 8 ml. and 14 ml. of isopropanol is added. Filtering gives a second crop of decinine bisulfate.

EXAMPLE 6

Tartaric acid (7.5 g.) is dissolved in 250 ml. of 98 percent ethanol and 1.25 ml. of this solution is added to 437.5 mg. of decinine dissolved in 4–5 ml. of ethanol. The resulting mixture is concentrated to about 3.5 ml. and an equal volume of ether is added. The mixture is filtered to give decinine tartrate.

EXAMPLE 7

Phosphoric acid (5.76 g. of 85 percent) is dissolved in 100 ml. of ethanol and 0.525 ml. of the solution is added to 437.5 mg. of decinine in hot ethanol. The mixture is cooled and filtered to give decinine phosphate.

EXAMPLE 8

1,2-Ethanedisulfonic acid dihydrate (11.30 g.) is dissolved in 100 ml. of absolute ethanol and 44 ml. of the solution is added rapidly with stirring to 8.760 g. of decinine in 90 ml. of boiling absolute ethanol. The mixture is allowed to stand for three hours at room temperature. The precipitate is filtered off, washed with absolute ethanol and then with petroleum ether and then dried in vacuo at 75°C. to give decinine mono-1,2-ethanedisulfonate.

The salts prepared as in Examples 5–8 are used in dose ranges given hereabove to prepare compositions as in Examples 1–4. These compositions are administered internally to produce glucocorticoid-like water diuretic and anti-inflammatory activity.

What is claimed is:

1. A method of producing glucocorticoid-like water diuretic and anti-inflammatory activity which comprises administering decinine or a pharmaceutically acceptable acid addition salt thereof internally to an animal organism requiring said activity in an amount sufficient to produce said activity.

2. The method of claim 1 in which decinine or a pharmaceutically acceptable acid addition salt thereof is administered in a daily dosage regimen of from about 5 mg. to about 1,000 mg.

3. The method of claim 1 in which decinine or a pharmaceutically acceptable acid addition salt thereof is administered in a daily dosage regimen of from about 25 mg. to about 600 mg.

4. The method of claim 1 in which decinine is administered.

5. A method of reducing tissue barrier permeabilities in an animal organism which comprises administering decinine or a pharmaceutically acceptable acid addition salt thereof internally to said animal organism requiring reducing of tissue barrier permeabilities in an amount sufficient to reduce tissue barrier permeabilities.

* * * * *